(12) United States Patent
Dunkley et al.

(10) Patent No.: US 10,902,625 B1
(45) Date of Patent: Jan. 26, 2021

(54) PLANAR SURFACE DETECTION

(71) Applicant: Apple Inc., Cupertino, CA (US)

(72) Inventors: Oliver Montague Welton Dunkley, Santa Clara, CA (US); Michael Jaison Gnanasekar, Santa Clara, CA (US); Aitor Aldoma Buchaca, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 122 days.

(21) Appl. No.: 16/254,858

(22) Filed: Jan. 23, 2019

Related U.S. Application Data

(60) Provisional application No. 62/620,971, filed on Jan. 23, 2018, provisional application No. 62/775,336, filed on Dec. 4, 2018.

(51) Int. Cl.
*G06T 7/60* (2017.01)
*G06T 7/50* (2017.01)

(52) U.S. Cl.
CPC ............ *G06T 7/60* (2013.01); *G06T 7/50* (2017.01); *G06T 2207/10028* (2013.01); *G06T 2207/20072* (2013.01); *G06T 2207/20076* (2013.01)

(58) Field of Classification Search
CPC .. G01C 15/004; G01C 21/005; G01C 15/002; G06T 15/20; G06T 19/006; G06T 2207/10028; G06T 2207/30241; G06T 7/13; G06T 17/00; G06T 19/20; G06T 2207/30232; G06T 2219/2004; G06T 17/05
See application file for complete search history.

(56) References Cited

U.S. PATENT DOCUMENTS

| | | | |
|---|---|---|---|
| 9,043,069 B1* | 5/2015 | Ferguson | G05D 1/00 |
| | | | 701/23 |
| 9,070,194 B2* | 6/2015 | Lee | G06T 7/521 |
| 9,251,417 B1 | 2/2016 | Xu et al. | |
| 9,558,564 B1* | 1/2017 | Korchev | G06T 7/246 |
| 9,578,310 B2 | 2/2017 | Baele et al. | |
| 9,836,871 B2 | 12/2017 | Chon | |
| 9,892,323 B2 | 2/2018 | Cho et al. | |
| 2014/0363073 A1* | 12/2014 | Shirakyan | G06T 7/12 |
| | | | 382/154 |
| 2015/0062120 A1* | 3/2015 | Reisner-Kollmann | |
| | | | G06T 19/006 |
| | | | 345/419 |
| 2015/0161881 A1* | 6/2015 | Takemura | G06K 9/00798 |
| | | | 348/148 |
| 2015/0199839 A1* | 7/2015 | Chon | G06T 17/05 |
| | | | 345/427 |
| 2016/0093101 A1 | 3/2016 | Benedek et al. | |

(Continued)

FOREIGN PATENT DOCUMENTS

CN 102436654 B 7/2013

*Primary Examiner* — Dung Hong
(74) *Attorney, Agent, or Firm* — Fernando & Partners, LLP

(57) ABSTRACT

In one implementation, a method of generating a horizontal plane hypothesis includes obtaining a point cloud of a scene including a plurality of points in a gravity-aligned coordinate system. The method includes generating, based on the plurality of points, a height histogram indicative of a plurality of non-overlapping height ranges in the gravity-aligned coordinate system and a respective plurality of weights. The method includes generating one or more horizontal plane hypotheses based on the height histogram.

19 Claims, 9 Drawing Sheets

(56) References Cited

U.S. PATENT DOCUMENTS

| | | |
|---|---|---|
| 2017/0154471 A1 | 6/2017 | Woo et al. |
| 2019/0019331 A1* | 1/2019 | Alliez .................. G06T 17/205 |
| 2019/0156507 A1* | 5/2019 | Zeng ....................... G06K 9/00 |
| 2020/0158874 A1* | 5/2020 | Li ......................... G01S 7/4808 |

* cited by examiner

PLANAR SURFACE DETECTION

CROSS-REFERENCE TO RELATED APPLICATIONS

This application claims priority to U.S. Provisional Patent App. No. 62/620,971, filed on Jan. 23, 2018, and U.S. Provisional Patent App. No. 62/775,336, filed on Dec. 4, 2018, both of which are hereby incorporated by reference in their entirety.

TECHNICAL FIELD

The present disclosure generally relates to plane detection, and in particular, to systems, methods, and devices for detecting horizontal and/or vertical planes.

BACKGROUND

As described herein, in order to provide immersive media experiences to a user, computing devices present computer-generated reality (CGR) that intertwines computer-generated media content (e.g., including images, video, audio, smells, haptics, etc.) with real-world stimuli to varying degrees—ranging from wholly synthetic experiences to barely perceptible computer-generated media content superimposed on real-world stimuli. To these ends, in accordance with various implementations described herein, CGR systems, methods, and devices include mixed reality (MR) and virtual reality (VR) systems, methods, and devices. Further, MR systems, methods, and devices include augmented reality (AR) systems in which computer-generated content is superimposed (e.g., via a transparent display) upon the field-of-view of the user and composited reality (CR) systems in which computer-generated content is composited or merged with an image of the real-world environment. While the present description provides delineations between AR, CR, MR, and VR for the mere sake of clarity, those of ordinary skill in the art will appreciate from the present disclosure that such delineations are neither absolute nor limiting with respect to the implementation of any particular CGR system, method, and/or device. Thus, in various implementations, a CGR environment include elements from a suitable combination of AR, CR, MR, and VR in order to produce any number of desired immersive media experiences.

In various implementations, a user is present in a CGR environment, either physically or represented by an avatar (which may be virtual or real, e.g., a drone or robotic avatar). In various implementations, the avatar simulates some or all of the physical movements of the user.

A CGR environment based on VR may be wholly immersive to the extent that real-world sensory inputs of particular senses of the user (e.g., vision and/or hearing) are completely replaced with computer-generated sensory inputs. Accordingly, the user is unable to see and/or hear his/her real-world surroundings. CGR environments based on VR can utilize (spatial) audio, haptics, etc. in addition to computer-generated images to enhance the realism of the experience. Thus, in various implementations, real-world information of particular senses provided to the user is limited to depth, shape, orientation, and/or layout information; and such real-world information is passed indirectly to the user. For example, the walls of real-world room are completely skinned with digital content so that the user cannot see the real-world walls as they exist in reality.

A CGR environment based on mixed reality (MR) includes, in addition to computer-generated media content, real-world stimuli received by a user either directly, as in the case of a CGR environment based on augmented reality (AR), or indirectly, as in the case of a CGR environment based on composited reality (CR).

A CGR environment based on augmented reality (AR) includes real-world optical passthrough such that real-world light enters a user's eyes. For example, in an AR system a user is able to see the real world through a transparent surface, and computer-generated media content (e.g., images and/or video) is projected onto that surface. In particular implementations, the media content is projected onto the surface to give the visual impression that the computer-generated media content is a part of and/or anchored to the real-world. Additionally or alternatively, the computer-generated image data may be projected directly towards a user's eyes so that real-world light and the projected light of the computer-generated media content concurrently arrive on a user's retinas.

A CGR environment based on composited reality (CR) includes obtaining real-world stimulus data obtained from an appropriate sensor and compositing the real-world stimulus data with computer-generated media content (e.g., merging the stimulus data with the computer-generated content, superimposing the computer-generated content over portions of the stimulus data, or otherwise altering the real-world stimulus data before presenting it to the user) to generated composited data. The composited data is then provided to the user, and thus the user receives the real-world stimulus indirectly, if at all. For example, for visual portions of a GGR environment based on CR, real-world image data is obtained using an image sensor, and the composited image data is provided via a display. Placing CGR objects in an unmapped or dynamic scene presents a challenge from at least a user experience perspective. If a CGR object is placed within a scene without a suitable virtual substrate, the CGR object may not be anchored to a real-world surface in the scene. As such, the CGR object may float in mid-air, occlude a real-world object, or collide with a real-world object. This produces a poor user experience that is neither lifelike nor believable. Accordingly, in various implementations, this challenge is solved by detecting planes within the scene and determining their extents in order to provide virtual substrates on which to place CGR objects.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
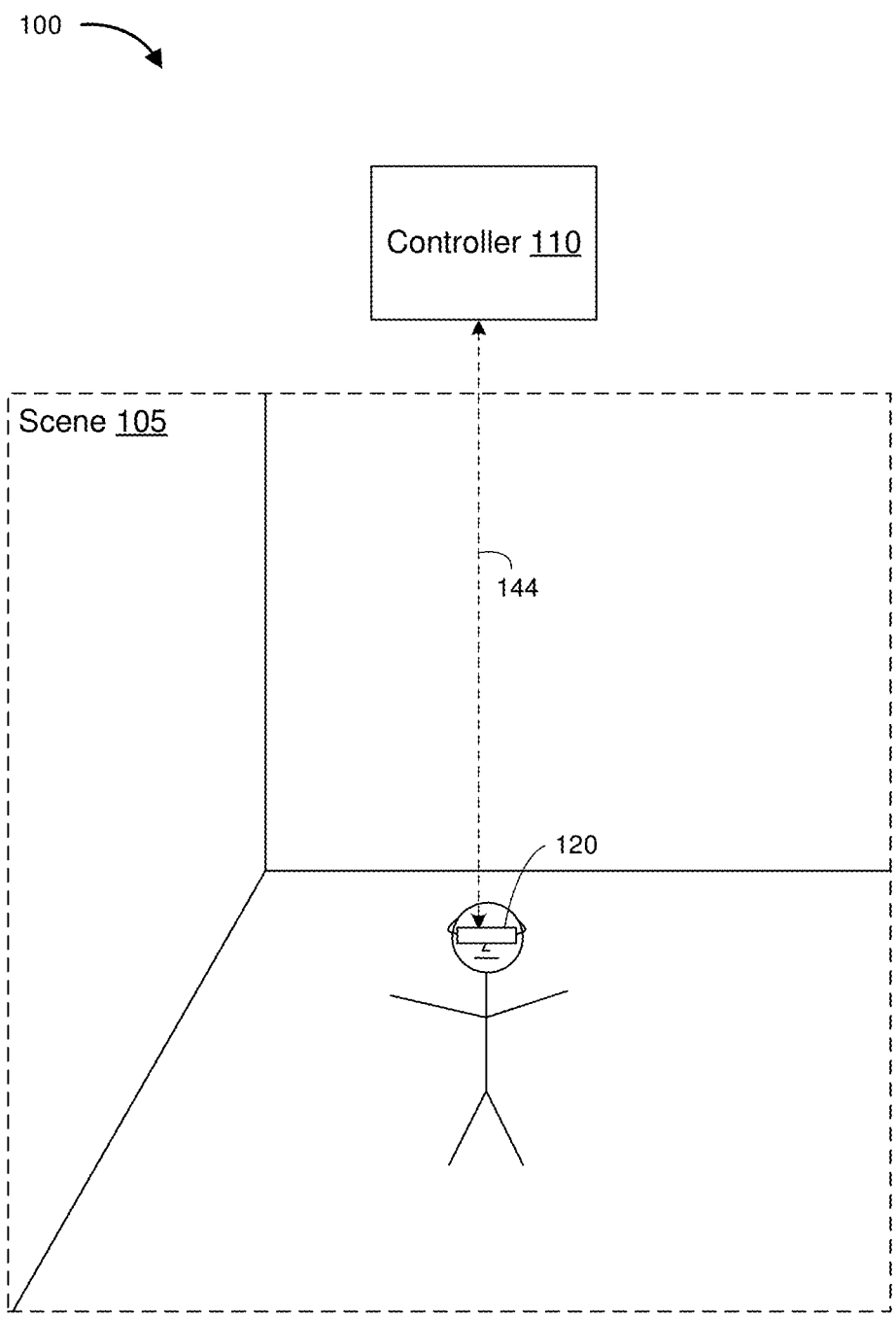
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for detecting horizontal and/or vertical planes. In various implementations, a method includes obtaining a point cloud of a scene including a plurality of points in a gravity-aligned coordinate system. The method includes generating, based on the plurality of points, a height histogram indicative of a plurality of non-overlapping height ranges in the gravity-aligned coordinate system and a respective plurality of weights. The method includes generating one or more horizontal plane hypotheses based on the height histogram.

In various implementations, a method includes obtaining a point cloud of a scene including a plurality of points in a gravity-aligned coordinate system. The method includes generating, based on the plurality of points, a line-space image, each pixel of the line-space image corresponding to a two-parameter representation of a respective line at a common height in the gravity-aligned coordinate system and each pixel having a pixel value. The method includes generating one or more vertical plane hypotheses based on the one or more lines.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In order to allow a user to place CGR objects in a CGR environment, the scene is mapped to produce a number of plane hypotheses generally describing real-world surfaces upon which CGR objects can be placed. Scene mapping can be time-consuming and/or computationally expensive. However, detecting planes of a particular geometry, such as horizontal planes or vertical planes, can be more quickly and efficiently performed.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an HMD 120.

In some implementations, the controller 110 is configured to manage and coordinate a CGR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of HMD 120.

In some implementations, the HMD 120 is configured to provide the CGR experience to the user. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

In some implementations, the user wears the HMD 120 on his/her head. As such, the HMD 120 includes one or more CGR displays provided to display the CGR content. For example, in various implementations, the HMD 120 encloses the field-of-view of the user. In some implementations, the HMD 120 is replaced with a handheld device (such as a smartphone or tablet) configured to present CGR content, and rather than wearing the HMD 120 the user holds the device with a display directed towards the field-of-view of the user and a camera directed towards the scene 105. In some implementations, the handheld device can be placed within an enclosure that can be worn on the head of the user. In some implementations, the HMD 120 is replaced with a CGR chamber, enclosure, or room configured to present CGR content in which the user does not wear or hold the HMD 120.

Figure 2:
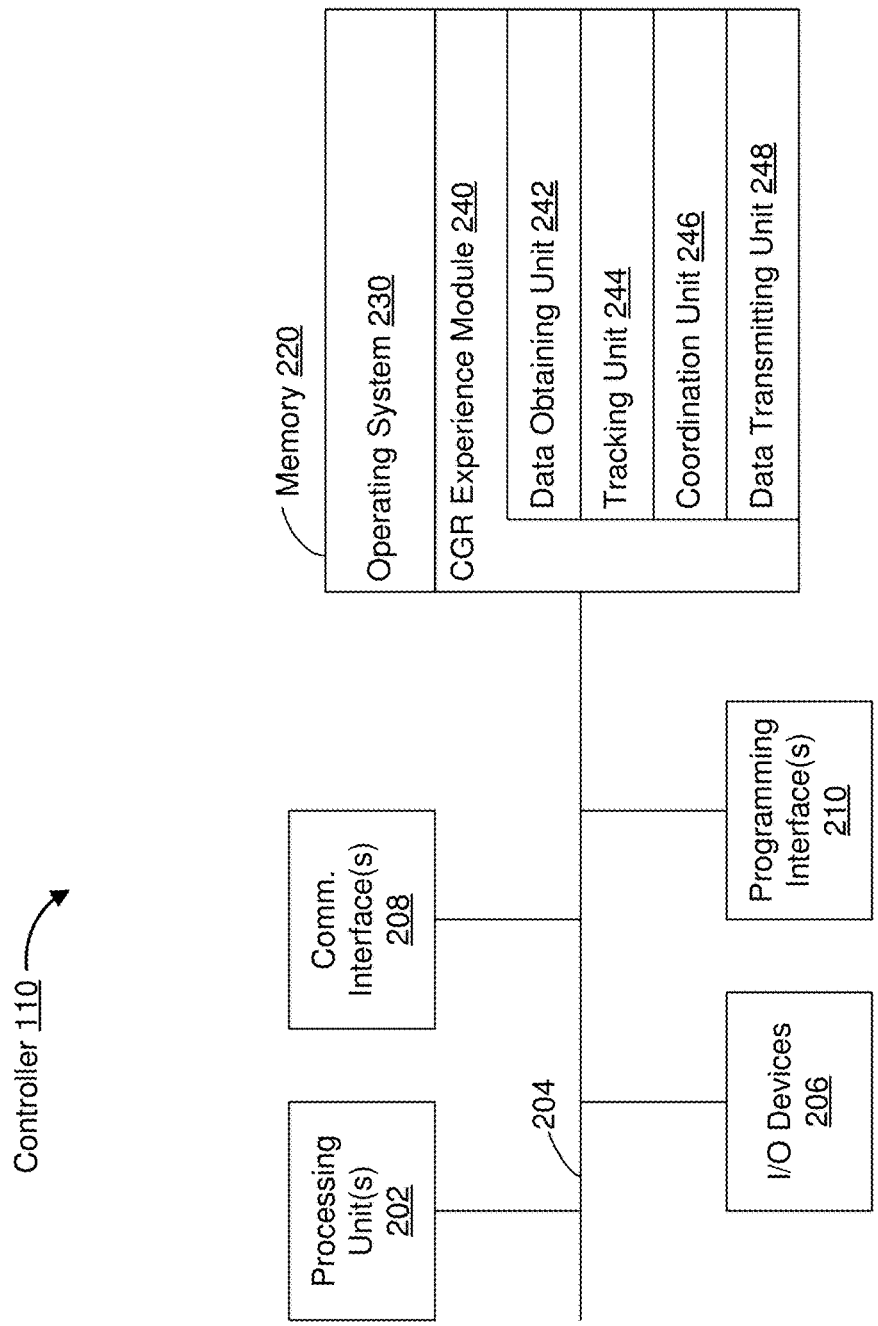
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a CGR experience module 240.

The operating system 230 includes procedures for handling various basic system services and for performing hardware dependent tasks. In some implementations, the CGR experience module 240 is configured to manage and coordinate one or more CGR experiences for one or more users (e.g., a single CGR experience for one or more users, or multiple CGR experiences for respective groups of one or more users). To that end, in various implementations, the CGR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the CGR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
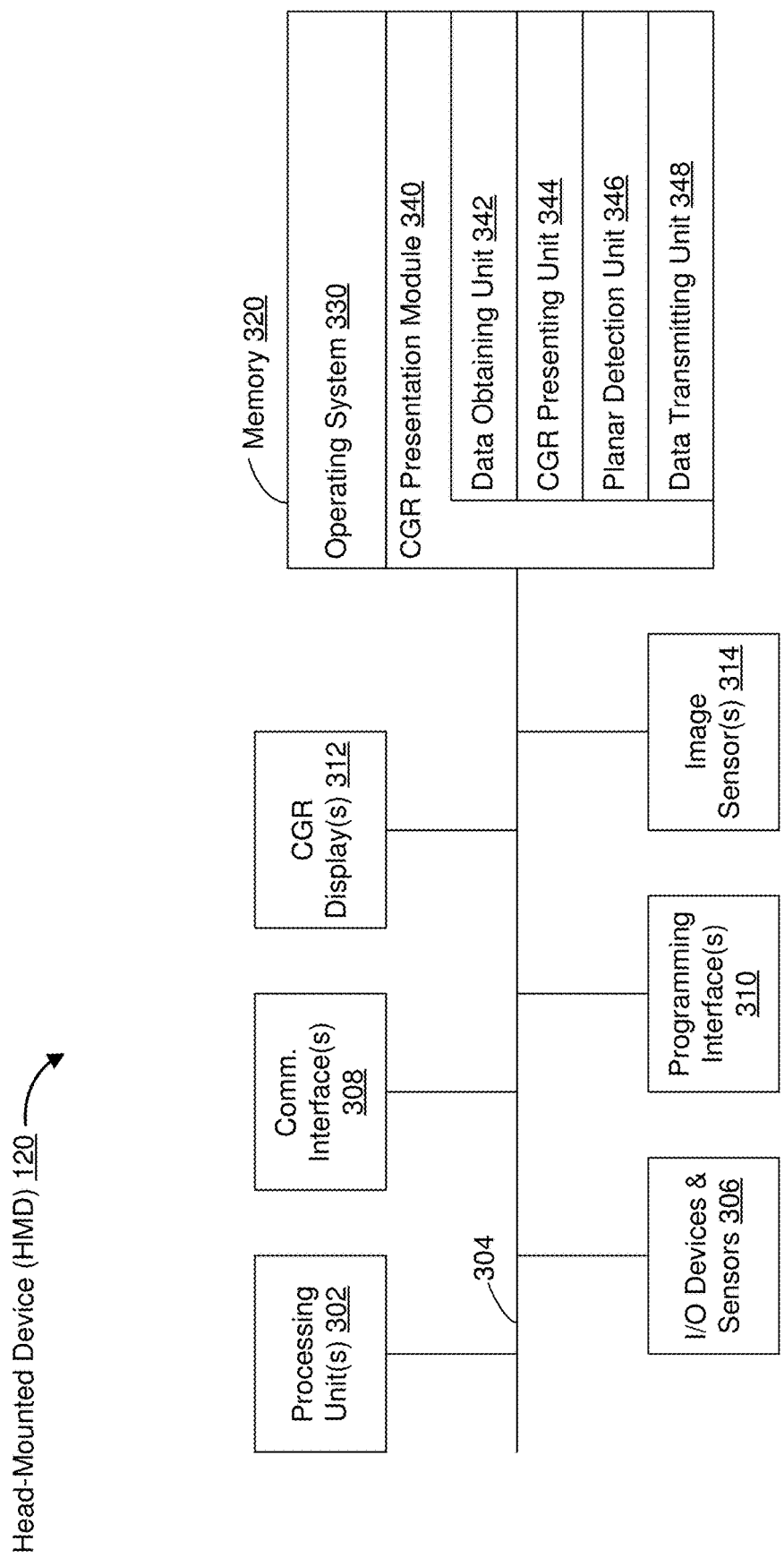
FIG. 3 is a block diagram of an example HMD in accordance with some implementations.

FIG. 3 is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more CGR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more CGR displays 312 are configured to provide the CGR experience to the user. In some implementations, the one or more CGR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more CGR displays 312 correspond to diffractive, reflective, polarized, holographic, etc. waveguide displays. For example, the HMD 120 includes a single MR display. In another example, the HMD 120 includes a CGR display for each eye of the user. In some implementations, the one or more CGR displays 312 are capable of presenting AR and VR content. In some implementations, the one or more CGR displays 312 are capable of presenting AR or VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a CGR presentation module 340.

The operating system 330 includes procedures for handling various basic system services and for performing hardware dependent tasks. In some implementations, the CGR presentation module 340 is configured to present CGR content to the user via the one or more CGR displays 312. To that end, in various implementations, the CGR presentation module 340 includes a data obtaining unit 342, a CGR presenting unit 344, a planar detection unit 346, and a data transmitting unit 348.

In some implementations, the data obtaining unit 342 is configured to obtain data (e.g., presentation data, interaction data, sensor data, location data, etc.) from at least the controller 110. To that end, in various implementations, the data obtaining unit 342 includes instructions and/or logic therefor, and heuristics and metadata therefor.

In some implementations, the CGR presenting unit 344 is configured to present CGR content via the one or more CGR displays 312. To that end, in various implementations, the CGR presenting unit 344 includes instructions and/or logic therefor, and heuristics and metadata therefor.

In some implementations, the planar detection unit 346 is configured to generate one or more planar hypotheses based on one or more images of the scene (e.g., captured using a scene camera of the one or more image sensors 314). To that end, in various implementations, the planar detection unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the CGR presenting unit 344, the planar detection unit 346, and the data transmitting unit 348 are shown as residing on a single device (e.g., the HMD 120), it should be understood that in other implementations, any combination of the data obtaining unit 342, the CGR presenting unit 344, the planar detection unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
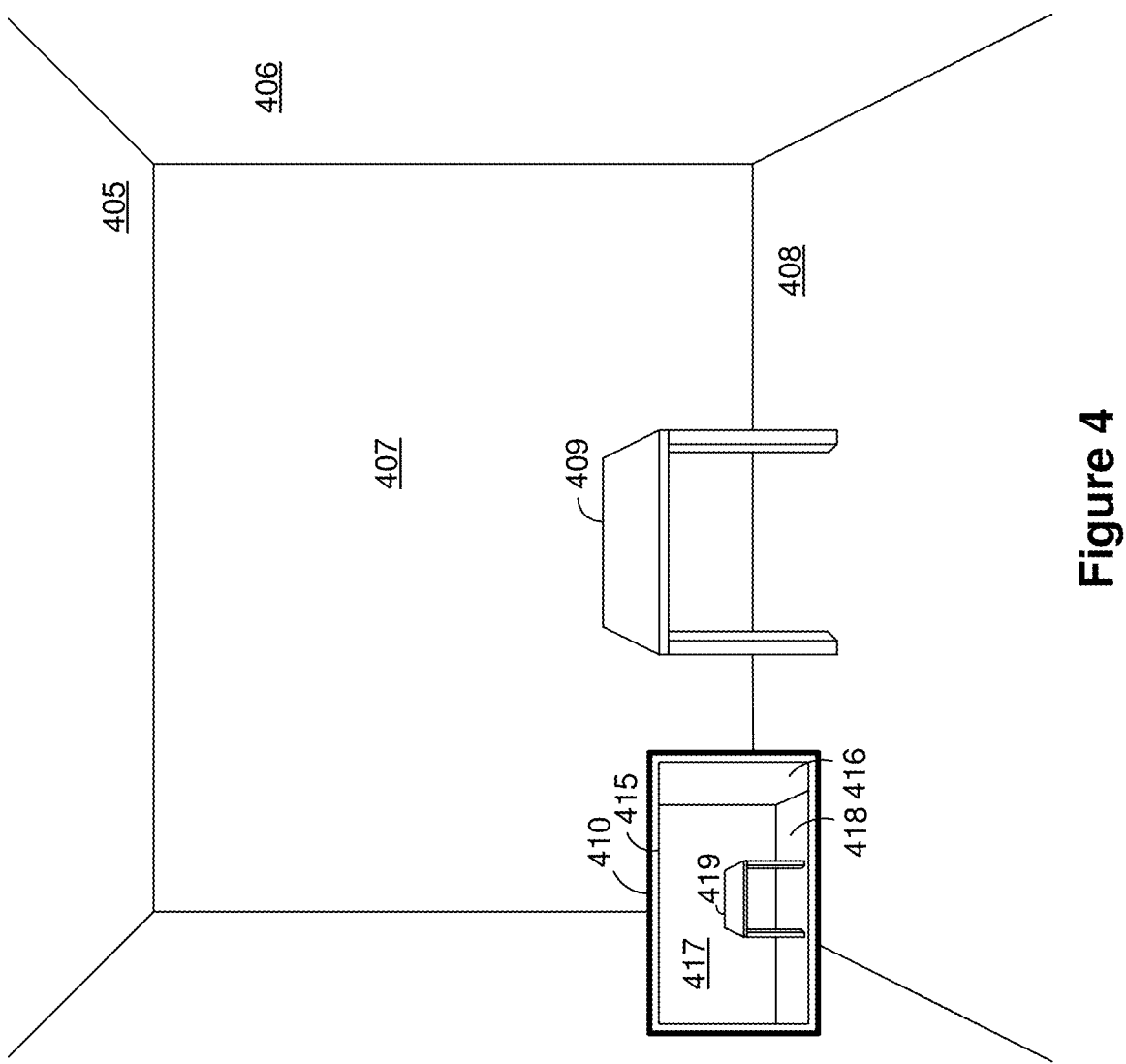
FIG. 4 illustrates a scene with a handheld electronic device surveying the scene.

FIG. 4 illustrates a scene 405 with a handheld electronic device 410 surveying the scene 405. The scene 405 includes a side wall 406, a back wall 407, a floor 408, and a table 409.

The handheld electronic device 410 displays a representation of the scene 415 including a representation of the side wall 416, a representation of the back wall 417, a representation of the floor 418, and a representation of the table 419. In surveying the scene 405, the handheld electronic device 410 generates a map of the scene 405 including a number of plane hypotheses in a CGR coordinate system. Each of the plane hypotheses defines a planar region in the CGR coordinate system and can be specified in any of number of ways. For example, in various implementations, a plane hypothesis includes a plane equation or corresponding coefficients. In various implementations, a plane hypothesis includes an indication of the bounds of the plane, e.g., the extent of the plane in the CGR coordinate system. Each of the plane hypotheses corresponds to a planar surface of the scene 405, such as the side wall 406, the back wall 407, the floor 408, or the top of the table 409.

Figure 5:
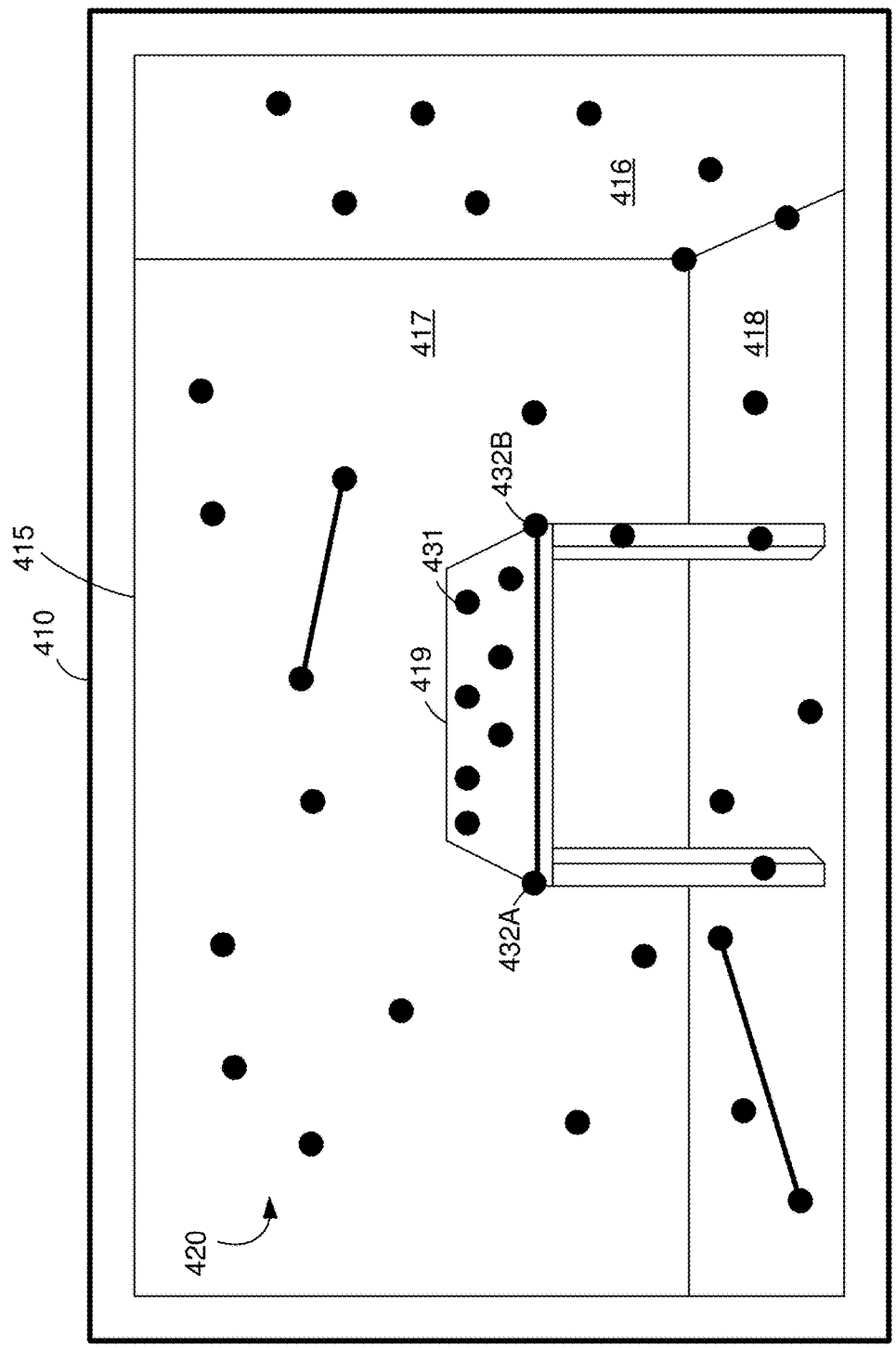
FIG. 5 illustrates the handheld electronic device surveying the scene of FIG. 4.

In various implementations, the handheld electronic device 410 generates a plane hypothesis based on a point cloud. FIG. 5 illustrates the handheld electronic device 410 displaying a plurality of points 420 of a point cloud overlaid on the representation of the scene 415.

In various implementations, the point cloud is based on an image of the scene including a plurality of pixels (e.g., a matrix of pixels) obtained by a scene camera. In various implementations, the point cloud includes a plurality of three-dimensional points in the CGR coordinate system. In various implementations, the CGR coordinate system is gravity-aligned such that one of the coordinates (e.g., the z-coordinate) extends opposite the direction of a gravity vector. The gravity vector may be obtained by an accelerometer of the handheld electronic device 410. Each point in the point cloud represents a point on a surface of the scene 405, such as a point on the side wall 406, the back wall 407, the floor 408, the top of the table 409, or the legs of the table 409. In various implementations, the point cloud is obtained using VIO (visual inertial odometry) and/or a depth sensor. In various implementations, the point cloud is based on the image of the scene and previous images of the scene 405 taken at different angles to provide stereoscopic imaging. In various implementations, a point in the point cloud is associated with metadata, such as a color, texture, reflectance, or transmittance of the point on the surface in the scene or a confidence in the position of the point on the surface in the scene 405 (e.g., an uncertainty).

In various implementations, the plurality of points 420 includes one or more unpaired points (or single points), such as the unpaired point 431. In various implementations, the plurality of points 420 includes one or more sets of paired points, such as the two paired points 432A-432B. The two paired points 432A-432B define a line and are the endpoints of the line.

The handheld electronic device 410 can employ a variety of methods to determine a plane hypothesis (or multiple plane hypotheses) from the point cloud. For example, in various implementations, RANSAC (random sample consensus) methods are used to generate a plane hypothesis based on the point cloud. In one RANSAC method, an iteration includes selecting three random points in the point cloud, determining a plane defined by the three random points, and determining the number of points in the point cloud within a preset distance (e.g., 1 cm) of the plane. That number of points forms a score (or confidence) for the plane and after a number of iterations, the plane with the highest score is selected for generation of a plane hypothesis. With the points on that plane detected removed from the point cloud, the method can be repeated to detect another plane.

However, in various implementations, RANSAC methods applied to three-dimensional point clouds can be time-consuming and computationally expensive. Accordingly, in various implementations, horizontal and/or vertical planes in the scene 405 are detected as follows.

Figure 6:
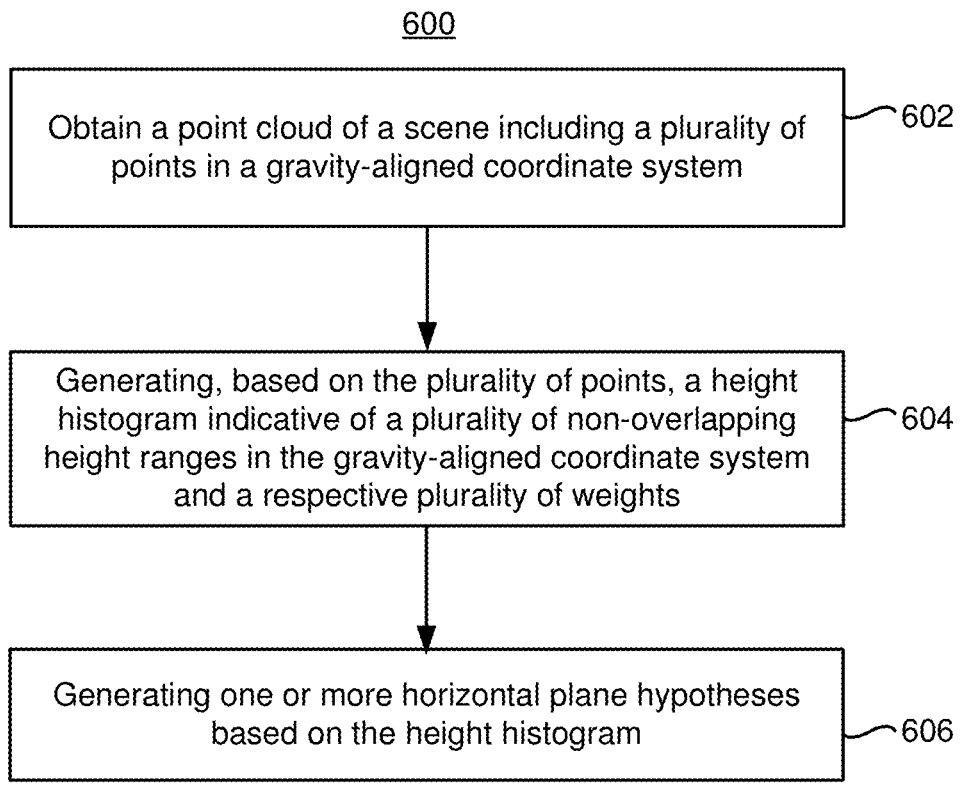
FIG. 6 is a flowchart representation of a method of generating a horizontal plane hypothesis in accordance with some implementations.

FIG. 6 is a flowchart representation of a method 600 of generating a horizontal plane hypothesis in accordance with some implementations. In various implementations, the method 600 is performed by a device with one or more processors, non-transitory memory, and a scene camera (e.g., the HMD 120 FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory). Briefly, in some circumstances, the method 600 includes: obtaining a point cloud of a scene, generating a height histogram of the points in the point cloud, and generating a horizontal plane hypothesis based on the height histogram.

The method 600 begins, in block 602, with the device obtaining a point cloud of a scene including a plurality of points in a gravity-aligned coordinate system. The point cloud may be obtained using a depth sensor, VIO, other computer vision techniques, or the like. In various implementations, each of the plurality of points is associated with three coordinates in the gravity-aligned coordinate system, one of the three coordinates (e.g., a "z-coordinate" or a "height coordinate") corresponding to a height of the point. In various implementations, each of the plurality of points is further associated with an uncertainty, e.g., an uncertainty (or, conversely, a confidence) in the position of the point on the surface in the scene. In various implementations, a point in the point cloud is associated with metadata, such as a color, texture, reflectance, or transmittance of the point on the surface in the scene.

In various implementations, the plurality of points includes one or more unpaired points. In various implementations, the plurality of points includes one or more sets of paired points. Each of the set of paired points defines a line having a length.

The method 600 continues, at block 604, with the device generating a height histogram indicative of a plurality of non-overlapping height ranges in the gravity-aligned coordinate system and a respective plurality of weights. In various implementations, each of the non-overlapping height ranges is defined a center height of the non-overlapping height range. In various implementations, a point is associated with one of the plurality of center heights when the height coordinate of the point lies within the non-overlapping height range. For example, a point having a height coordinate of 1.01 may be associated with a center height of "1" corresponding to a height range from 0.95-1.05.

Figure 7:
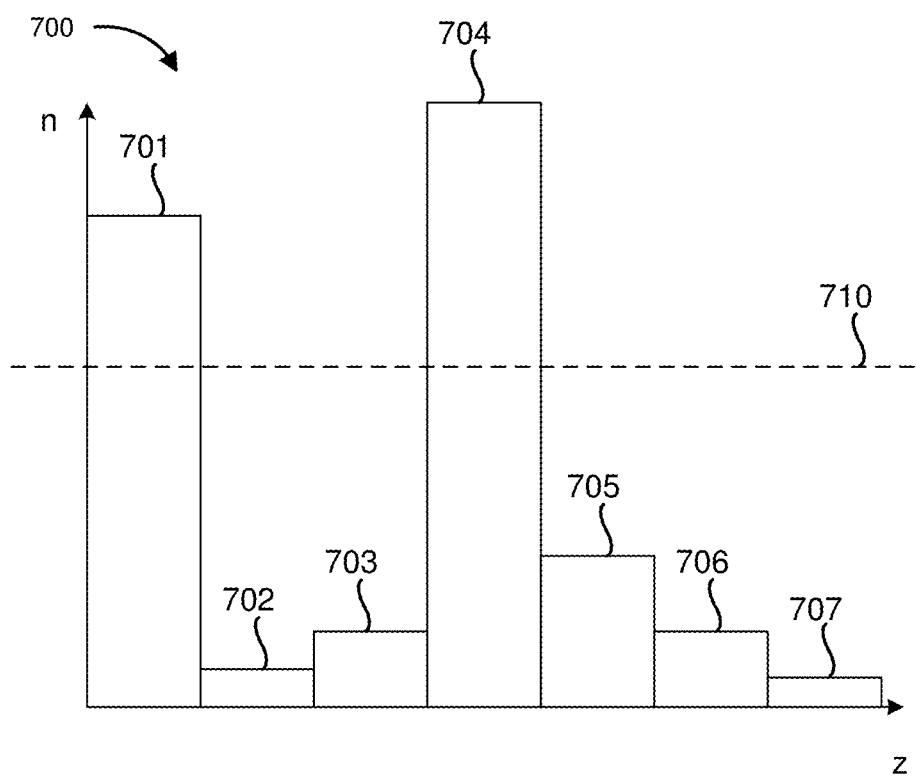
FIG. 7 illustrates an example height histogram based on the point cloud represented in FIG. 5.

FIG. 7 illustrates an example height histogram 700 based on the point cloud represented in FIG. 5. The height histogram 700 indicates that the point cloud includes a first height bin 701 associated with a first height range and a first weight, a second height bin 702 associated with a second height range and a second weight, a third height bin 703 associated with a third height range and a third weight, a fourth height bin 704 associated with a fourth height range and a fourth weight, a fifth height bin 705 associated with a fifth height range and a fifth weight, a sixth height bin 706 associated with a sixth height range and a sixth weight, and a seventh height bin 707 associated with a seventh height range and a seventh weight. Because the point cloud includes a significant number of points corresponding to the floor 408, the first weight of the first height bin 701 is greater than a threshold 710. Similarly, because the point cloud includes a significant number of points corresponding to the top of the table 409, the fourth weight of the fourth height bin 704 is greater than the threshold 710. The number of points at other heights are non-zero due to the point cloud including points corresponding to the side wall 406, back wall 407, and legs of the table 409.

In various implementations, generating the height histogram includes, for an unpaired point of the plurality of points (in particular, for each of the unpaired points of the plurality of points), determining a height of the unpaired point based on the one of the three coordinates (e.g., the height coordinate) and incrementing, by an amount, one of the respective plurality of weights of the height histogram corresponding to the one of the plurality of non-overlapping height ranges including the height of the unpaired point. In various implementations, the amount is a fixed value, e.g., 1. For example, FIG. 7 illustrates a height histogram 700 with seven height bins 701-707 corresponding to seven non-overlapping height ranges.

In various implementations, generating the height histogram includes, for two paired points of the plurality of points (in particular, for each set of two paired points of the plurality of points), determining a height of a line defined by the two paired point based on the one of the three coordinates (e.g., the height coordinate) of each of the two paired points, determining a length of the line based on the others of the three coordinates of each of the two paired points, and incrementing, by an amount scaled by the length of the line, one of the respective plurality of weights of the height histogram corresponding to the one of the plurality of height ranges including the height of the line. In various implementations, the amount is a fixed value, e.g., 1, scaled by the length of the line. Accordingly, two paired points defining a line increases the weight more than a single unpaired point or, in some embodiments, more than two unpaired points. In various implementations, incrementing the one of the respective plurality of weights is performed in response to determining that the line is substantially horizontal (e.g., with a threshold, such as 10%, of being horizontal). Thus, sets of paired points that define lines that are not substantially horizontal are ignored.

As noted above, in various implementations, each of the plurality of points is further associated with an uncertainty.

In various implementations, generating the height histogram includes, for an unpaired point of the plurality of points (in particular, for each unpaired point of the plurality of points), determining a height probability distribution of the point based on the one of the three coordinates (e.g., the height coordinate) and the uncertainty. Generating the height histogram further includes increasing a plurality of the respective plurality of weights of the height histogram corresponding to the probability distribution of the point. For example, an unpaired point of the point cloud may have a height coordinate of 1.01 and an uncertainty of ±0.2. Thus, the weight associated with a height range from 0.95-1.05 may be increased, and, also, the weights associated with a height range from 0.85-0.95 and a height range from 1.05-1.15 may also be increased. For example, in some embodiments, the weight associated with a height range from 0.95-1.05 is increased by 0.7, the weight associated with a height range from 0.85-0.95 is increased by 0.1, the weight associated with a height range from 1.05-1.15 is incremented by 0.1, and other weights associated with other height ranges are respectively incremented by 0.1 in total. In various implementations, the distribution of an amount among the weights is performed according to a Gaussian distribution.

In various implementations, generating the height histogram includes, for two paired points of the plurality of points (in particular, for each set of two paired points of the plurality of points), determining a height probability distribution of a line defined by the two paired points based on the one of the three coordinates (e.g., the height coordinate) and the uncertainty of each of the two paired points. Generating the height histogram includes determining a length of the line based on the others of the three coordinates of each of the two paired points. Generating the height histogram includes increasing, by an amount scaled by the length of the line, a plurality of the respective plurality of weights of the height histogram corresponding to the height probability distribution of the point. For example, a line defined two paired points of the point cloud may have a height of 1.01, an uncertainty of ±0.25, and a length of 3. Thus, the weight associated with a height range from 0.95-1.05 may be increased, and, also, the weights associated with a height range from 0.85-0.95 and a height range from 1.05-1.15 may also be increased. For example, in some embodiments, the weight associated with a height range from 0.95-1.05 is increased by 0.7 scaled by the length of the line to 2.1, the weight associated with a height range from 0.85-0.95 is increased by 0.1 scaled by the length of the line to 0.3, the weight associated with a height range from 1.05-1.15 is incremented by 0.1 scaled by the length of the line to 0.3, and other weights associated with other height ranges are respectively incremented by 0.3 in total. In various implementations, the distribution of an amount, scaled by the length of the line, among the weights is performed according to a Gaussian distribution. In various implementations, increasing a plurality of respective plurality of weights is performed in response to determining that the line is substantially horizontal (e.g., with a threshold, such as 10%, of being horizontal). Thus, sets of paired points that define lines that are not substantially horizontal are ignored.

The method 600 continues, at block 606, with the device generating one or more horizontal plane hypotheses based on the height histogram. Each horizontal plane hypothesis defines a horizontal plane in the gravity-aligned coordinate system and can be specified by a plane equation or corresponding coefficients. Thus, in various implementations, generating the one or more horizontal plane hypotheses includes generating one or more sets of planar coefficients, each set defining a horizontal plane (e.g., a plane normal to the gravity vector).

In various implementations, the device thresholds the height histogram and generates a horizontal plane hypothesis for each height bin of the height histogram that is above a threshold. Thus, in various implementations, the device determines that one or more weights of the height histogram is greater than a threshold and generates one or more plane hypotheses corresponding to the one or more respective height ranges. For example, with reference to FIG. 7, the device generates a first plane hypothesis corresponding to the first height bin 701 and a second plane hypothesis corresponding to the fourth height bin 704. The first plane hypothesis describes a first horizontal plane (e.g., normal to the gravity vector) at a height corresponding to the first height bin 701 (e.g., its center height) and the second plane hypothesis describes a second horizontal plane at a height corresponding to the fourth height bin 704.

In various implementations, the device detects one or more peaks in the height histogram and generates one or more horizontal plane hypotheses corresponding to the peaks. In various implementations, the device applies a non-maxima suppression algorithm to the height histogram in detecting the one or more peaks. For example, in various implementations, the device filters the height histogram.

Whereas FIG. 6 describes detection of horizontal planes, the method 600 can also be used to detect any of a set of planes with one degree of freedom by generating a histogram indicative of the number of points of the plurality of points associated with each of a plurality of locations along an axis. For example, the method 600 can be used to detect the presence of planes that are normal to the line-of-sight of the electronic device by generating a histogram indicative of the number of points of the plurality of points associated with each of a plurality of depths along an axis parallel to the line-of-sight.

Figure 8:
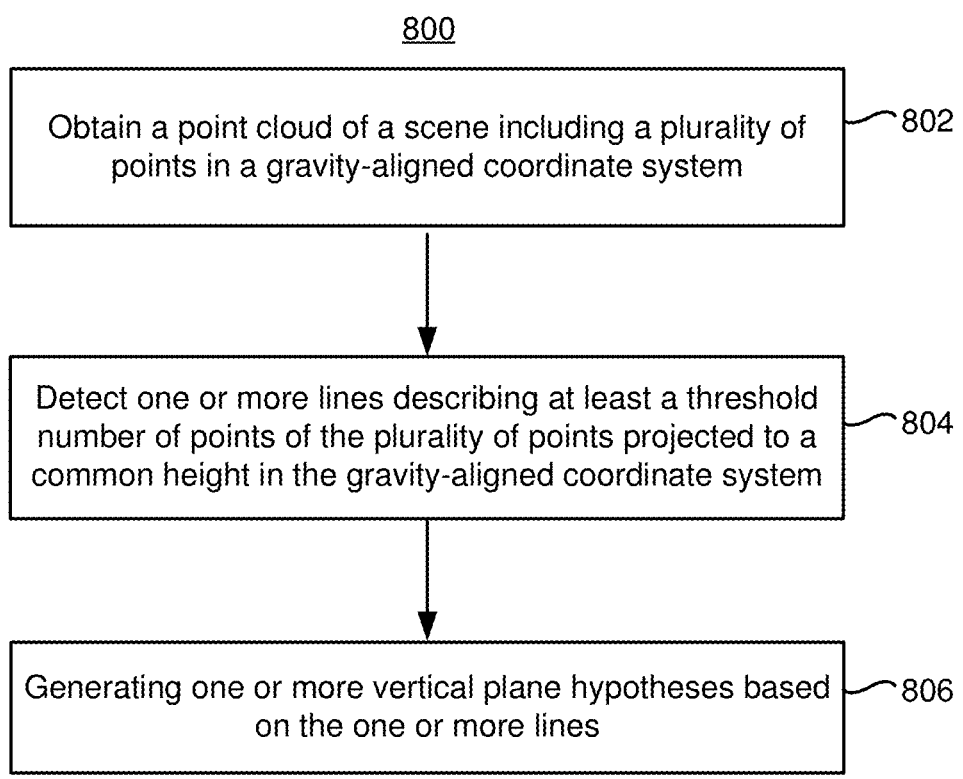
FIG. 8 is a flowchart representation of a method of generating a vertical plane hypothesis in accordance with some implementations.

FIG. 8 is a flowchart representation of a method 800 of generating a vertical plane hypothesis in accordance with some implementations. In various implementations, the method 800 is performed by a device with one or more processors, non-transitory memory, and a scene camera (e.g., the HMD 120 FIG. 3). In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory). Briefly, in some circumstances, the method 800 includes: obtaining a point cloud of a scene, detecting one or more lines describing at least a threshold number of points of the point cloud (as projected to a common height), and generating one or more vertical plane hypotheses based on the one or more lines.

The method 800 begins, in block 802, with the device obtaining a point cloud of a scene including a plurality of points in a gravity-aligned coordinate system. The point cloud may be obtained using a depth sensor, VIO, other computer vision techniques, or the like. In various implementations, each of the plurality of points is associated with three coordinates in the gravity-aligned coordinate system, one of the three coordinates (e.g., a "z-coordinate" or a "height coordinate") corresponding to a height of the point. In various implementations, each of the plurality of points is further associated with an uncertainty, e.g., an uncertainty (or, similarly, a confidence) in the position of the point on the surface in the scene. In various implementations, a point in the point cloud is associated with metadata, such as a color, texture, reflectance, or transmittance of the point on the surface in the scene.

In various implementations, the plurality of points includes one or more unpaired points. In various implementations, the plurality of points includes one or more sets of paired points. Each of the set of paired points defines a line having a length.

The method 800 continues, at block 804, with the device generating, based on the plurality of points, a line-space image, each pixel of the line-space image corresponding to a two-parameter representation of a respective line at a common height in the gravity-aligned coordinate system and each pixel having a pixel value. In various implementations, the device projects the plurality of points to a common height in the gravity-aligned coordinate system by setting the height coordinate of each point to zero or simply ignoring the height coordinate of each point to obtain a two-dimensional (2D) point map. Thus, in various implementations, the device detects the one or more lines by processing the plurality of points of the point cloud without the one of the three coordinates corresponding to the height of the point.

Figure 9A:
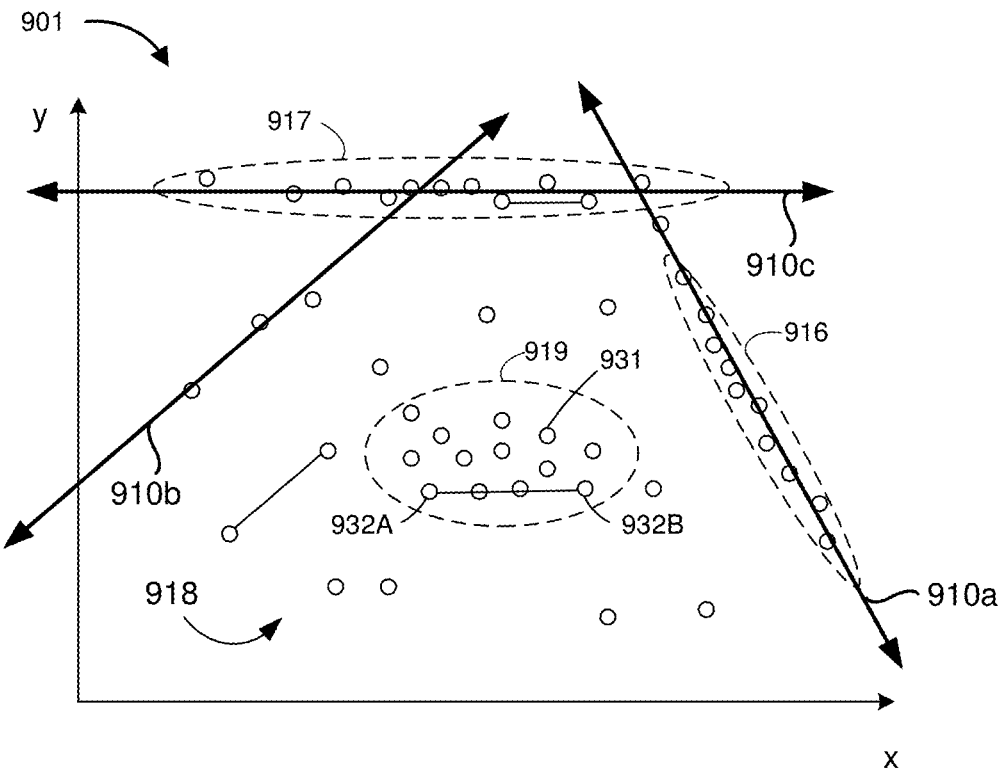
FIG. 9A illustrates an example 2D point map based on the point cloud represented in FIG. 5.

FIG. 9A illustrates an example 2D point map 901 based on the point cloud represented in FIG. 5. The 2D point map 901 includes a first cluster of points 916 corresponding to points of the point cloud corresponding to the side wall 406. The 2D point map 901 includes a second cluster of points 917 corresponding to points of the point cloud corresponding to the back wall 407. The 2D point map 901 includes a third cluster of points 909 corresponding to points of the point cloud corresponding to the table 409. The 2D point map 901 includes other points 918, spread out, corresponding to points of the point cloud corresponding to the floor 408.

The 2D point map 901 includes unpaired points, such a point 931 corresponding to unpaired point 431 of FIG. 5, and paired points, such as paired points 932A-932B corresponding to paired points 432A-432B of FIG. 5.

FIG. 9A illustrates a first line 910a, a second line 910b, and a third line 910c overlaid on the 2D point map 901. The first line 910a represents all of the points of the first cluster of points 916, one point from the second cluster of points 917, and one other point 918. The second line 910b represents a few of the other points 918 and a few points of the second cluster of points 917. The third line 910c represents all of the points of the second cluster of points 917.

In various implementations, a line is considered to represent a point in the 2D point map 901 when the point is less than a threshold distance from the line. In various implementations, the distance is an L1-distance or an L2-distance. In various implementations, when a point is associated with an uncertainty, a line is considered to represent the point when the likelihood that the point lies on the line is above a threshold.

As noted above, each pixel of the line-space image corresponding to a two-parameter representation of a respective line at the common height in the gravity-aligned coordinate system. For example, a pixel at location (u,v) corresponds to a line along a ground of the gravity-aligned coordinate system represented by the parameters u and v. In various implementations, the line can be represented in slope-intercept form (e.g., y=mx+b), where m and b are functions of u and v. In various implementations, the line can be represented in distance-angle or Hesse normal form (e.g., r=x cos(θ)+y sin(θ)), where r and θ are functions of u and v.

In other words, each pixel of the line-space image corresponds to a line such as the first line 910a, second line 910b, and third line 910c overlaid on the 2D point map and each pixel has a pixel value corresponding to a number of points of the 2D point cloud represented by the line.

Figure 9B:
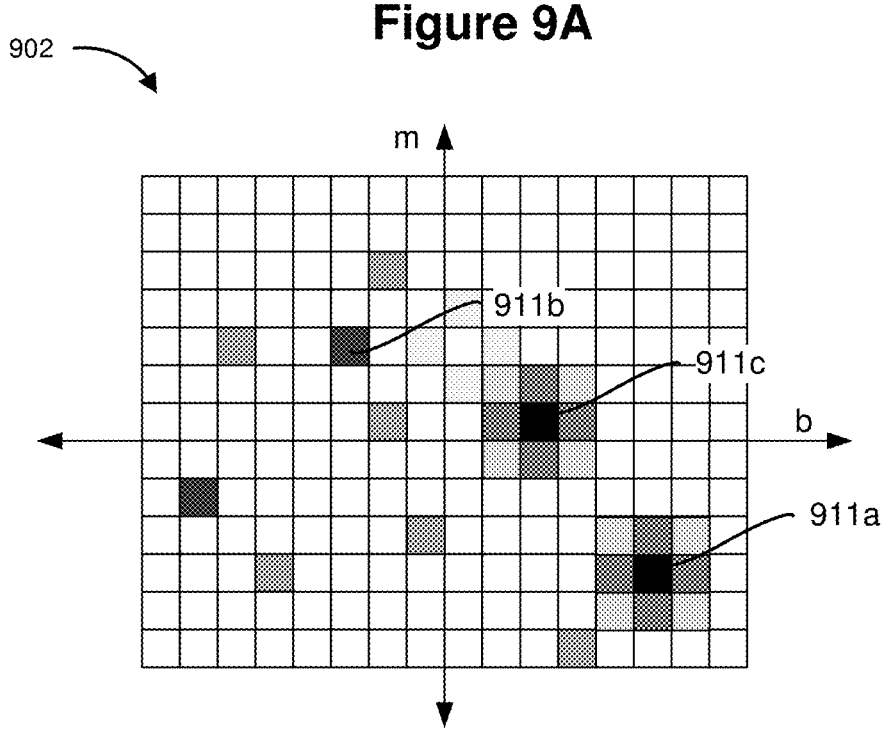
FIG. 9B illustrates an example line-space image based on the point cloud represented in FIG. 5.

FIG. 9B illustrates an example line-space image 902 based on the point cloud represented in FIG. 5. The line-space image 902 includes a first peak 911a at a pixel location corresponding to the first line 910a of FIG. 9A. The line-space image 902 includes a second peak 911b at a pixel location corresponding to the second line 910b of FIG. 9A. The line-space image 902 includes a third peak 911c at a pixel location corresponding to the third line 910c of FIG. 9A.

In various implementations, the device generates the line-space image by performing a Hough transform of unpaired points of the point cloud (e.g., projected onto a 2D point map). The line-space image generated by the Hough transform may then be modified based on paired points of the point cloud.

In various implementations, the device generates the line-space image using Monte Carlo sampling of pairs of points. For example, the device: (1) selects two points of the point cloud, (2) determines two parameters of a line projected to the common height in the gravity-aligned coordinate system defined by the two points (e.g., determines the slope and intercept or the distance and angle), and (3) increments, by an amount, a pixel value of a pixel of the line-space image corresponding to the two parameters. The device does this repeatedly a large number of times until the line-space image converges. In various implementations, selecting the two points includes randomly selecting two unpaired points of the points. In various implementations, selecting the two points includes selecting two paired points of the point cloud, in which case the pixel value is incremented by the amount scaled by a length of the line. Thus, in some sense, the line-space image is also a two-dimensional histogram of respective lines, each dimension being one parameter of a two-parameter representation of the line and the amount at each bin being representative of the number of lines through points of the points cloud having such a two-parameter representation.

In various implementations, when the points are associated with respective uncertainties, generating the line-space image using Monte Carlo samples includes (1) selecting two points of the point cloud, (2) determining two parameters of a line projected to the common height in the gravity-aligned coordinate system defined by the two points, (3) determining a probability distribution of the two parameters based on the two parameters and the respective uncertainties of the two points, and (4) increasing, by an amount, pixel values of a plurality of pixels of the line-space image corresponding to the probability distribution of the two parameters. In various implementations, selecting the two points includes randomly selecting two unpaired points of the points. In various implementations, selecting the two points includes selecting two paired points of the point cloud, in which case the pixel value is increased by the amount scaled by a length of the line.

The method 800 continues, at block 806, with the device generating one or more vertical plane hypotheses based on the line-space image. In various implementations, generating the one or more vertical plane hypotheses includes generating one or more sets of planar coefficients, each set defining a vertical plane (e.g., parallel to the gravity vector).

In various implementations, the device thresholds the line-space image and generates a vertical plane hypothesis for each pixel in the line-space image having a pixel value that is above a threshold. Thus, in various implementations, generating the one or more vertical plane hypotheses includes determining that one or more pixel values are greater than a threshold and generating one or more vertical plane hypotheses corresponding to the one or more pixel values greater than the threshold. For example, with reference to FIG. 9B, the device generates a first plane hypothesis corresponding to the first peak 911a (corresponding to the first line 910a, the first cluster of points 916, and the side wall 406) and a second plane hypothesis corresponding to the third peak 911c (corresponding to the third line 910c, the second cluster of points 917, and the back wall 407).

In various implementations, the device generates the one or more vertical plane hypotheses by detecting one or more peaks in the line-space image and generating one or more vertical plane hypotheses corresponding to the peaks. In various implementations, in detecting the one or more peaks, the device applies non-maxima suppression algorithm to the line-space image.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:
1. A method comprising:
obtaining a point cloud of a scene including a plurality of points in a gravity-aligned coordinate system;
generating, based on the plurality of points, a height histogram indicative of a plurality of non-overlapping height ranges in the gravity-aligned coordinate system and a respective plurality of weights; and
generating one or more horizontal plane hypotheses based on the height histogram, wherein generating the one or more horizontal plane hypotheses includes determining that one or more weights of the height histogram is greater than a threshold and generating one or more horizontal plane hypotheses corresponding to the respective height ranges.

2. The method of claim 1, wherein each of the plurality of points is associated with three coordinates in the gravity-aligned coordinate system, one of the three coordinates corresponding to a height of the point.

3. The method of claim 2, wherein generating the height histogram includes, for an unpaired point of the plurality of points:
determining a height of the unpaired point based on the one of the three coordinates; and
incrementing, by an amount, one of the respective plurality of weights of the height histogram corresponding to the one of the plurality of non-overlapping height ranges including the height of the unpaired point.

4. The method of claim 2, wherein generating the height histogram includes, for two paired points of the plurality of points:
determining a height of a line defined by the two paired point based on the one of the three coordinates of each of the two paired points;
determining a length of the line based on the others of the three coordinates of each of the two paired points; and incrementing, by an amount scaled by the length of the line, one of the respective plurality of weights of the height histogram corresponding to the one of the plurality of height ranges including the height of the line.

5. The method of claim 4, wherein incrementing the one of the respective plurality of weights is performed in response to determining that the line is substantially horizontal.

6. The method of claim 2, wherein each of the plurality of points is further associated with an uncertainty.

7. The method of claim 6, wherein generating the height histogram includes, for an unpaired point of the plurality of points:
   determining a height probability distribution of the unpaired point based on the one of the three coordinates and the uncertainty; and
   increasing a plurality of the respective plurality of weights of the height histogram corresponding to the height probability distribution of the point.

8. The method of claim 6, wherein generating the height histogram includes, for two paired point of the plurality of points:
   determining a height probability distribution of a line defined by the two paired points based on the one of the three coordinates and the uncertainty of each of the two paired points; and
   determining a length of the line based on the others of the three coordinates of each of the two paired points; and
   increasing, by an amount scaled by the length of the line, a plurality of the respective plurality of weights of the height histogram corresponding to the height probability distribution of the point.

9. The method of claim 8, wherein increasing the plurality of the respective plurality of weights is performed in response to determining that the line is substantially horizontal.

10. The method of claim 1, wherein generating the one or more horizontal plane hypotheses includes detecting one or more peaks in the height histogram and generating one or more horizontal plane hypotheses corresponding to the peaks.

11. The method of claim 10, further comprising applying a non-maxima suppression algorithm to the height histogram.

12. The method of claim 1, wherein generating the one or more horizontal plane hypotheses includes generating one or more sets of planar coefficients, each set defining a horizontal plane.

13. A device comprising:
   a scene camera; and
   one or more processors to:
      obtain a point cloud of a scene including a plurality of points in a gravity-aligned coordinate system;
      generate, based on the plurality of points, a height histogram indicative of a plurality of non-overlapping height ranges in the gravity-aligned coordinate system and a respective plurality of weights; and
      generate one or more horizontal plane hypotheses based on the height histogram wherein generating the one or more horizontal plane hypotheses includes determining that one or more weights of the height histogram is greater than a threshold and generating one or more horizontal plane hypotheses corresponding to the respective height ranges.

14. The device of claim 13, wherein each of the plurality of points is associated with three coordinates in the gravity-aligned coordinate system, one of the three coordinates corresponding to a height of the point.

15. The device of claim 14, wherein generating the height histogram includes, for an unpaired point of the plurality of points:
   determining a height of the unpaired point based on the one of the three coordinates; and
   incrementing, by an amount, one of the respective plurality of weights of the height histogram corresponding to the one of the plurality of non-overlapping height ranges including the height of the unpaired point.

16. The device of claim 14, wherein generating the height histogram includes, for two paired points of the plurality of points:
   determining a height of a line defined by the two paired point based on the one of the three coordinates of each of the two paired points;
   determining a length of the line based on the others of the three coordinates of each of the two paired points; and
   incrementing, by an amount scaled by the length of the line, one of the respective plurality of weights of the height histogram corresponding to the one of the plurality of height ranges including the height of the line.

17. A non-transitory memory storing one or more programs, which, when executed by one or more processors of a device with one or more scene cameras, cause the device to:
   obtain a point cloud of a scene including a plurality of points in a gravity-aligned coordinate system;
   generate, based on the plurality of points, a height histogram indicative of a plurality of non-overlapping height ranges in the gravity-aligned coordinate system and a respective plurality of weights; and
   generate one or more horizontal plane hypotheses based on the height histogram, wherein generating the one or more horizontal plane hypotheses includes determining that one or more weights of the height histogram is greater than a threshold and generating one or more horizontal plane hypotheses corresponding to the respective height ranges.

18. The non-transitory computer-readable medium of claim 17, wherein each of the plurality of points is associated with three coordinates in the gravity-aligned coordinate system, one of the three coordinates corresponding to a height of the point, wherein generating the height histogram includes, for an unpaired point of the plurality of points:
   determining a height of the unpaired point based on the one of the three coordinates; and
   incrementing, by an amount, one of the respective plurality of weights of the height histogram corresponding to the one of the plurality of non-overlapping height ranges including the height of the unpaired point.

19. The non-transitory computer-readable medium of claim 17, wherein each of the plurality of points is associated with three coordinates in the gravity-aligned coordinate system, one of the three coordinates corresponding to a height of the point, wherein generating the height histogram includes, for two paired points of the plurality of points:
   determining a height of a line defined by the two paired point based on the one of the three coordinates of each of the two paired points;
   determining a length of the line based on the others of the three coordinates of each of the two paired points; and
   incrementing, by an amount scaled by the length of the line, one of the respective plurality of weights of the height histogram corresponding to the one of the plurality of height ranges including the height of the line.

* * * * *